United States Patent Office 3,062,942
Patented Nov. 6, 1962

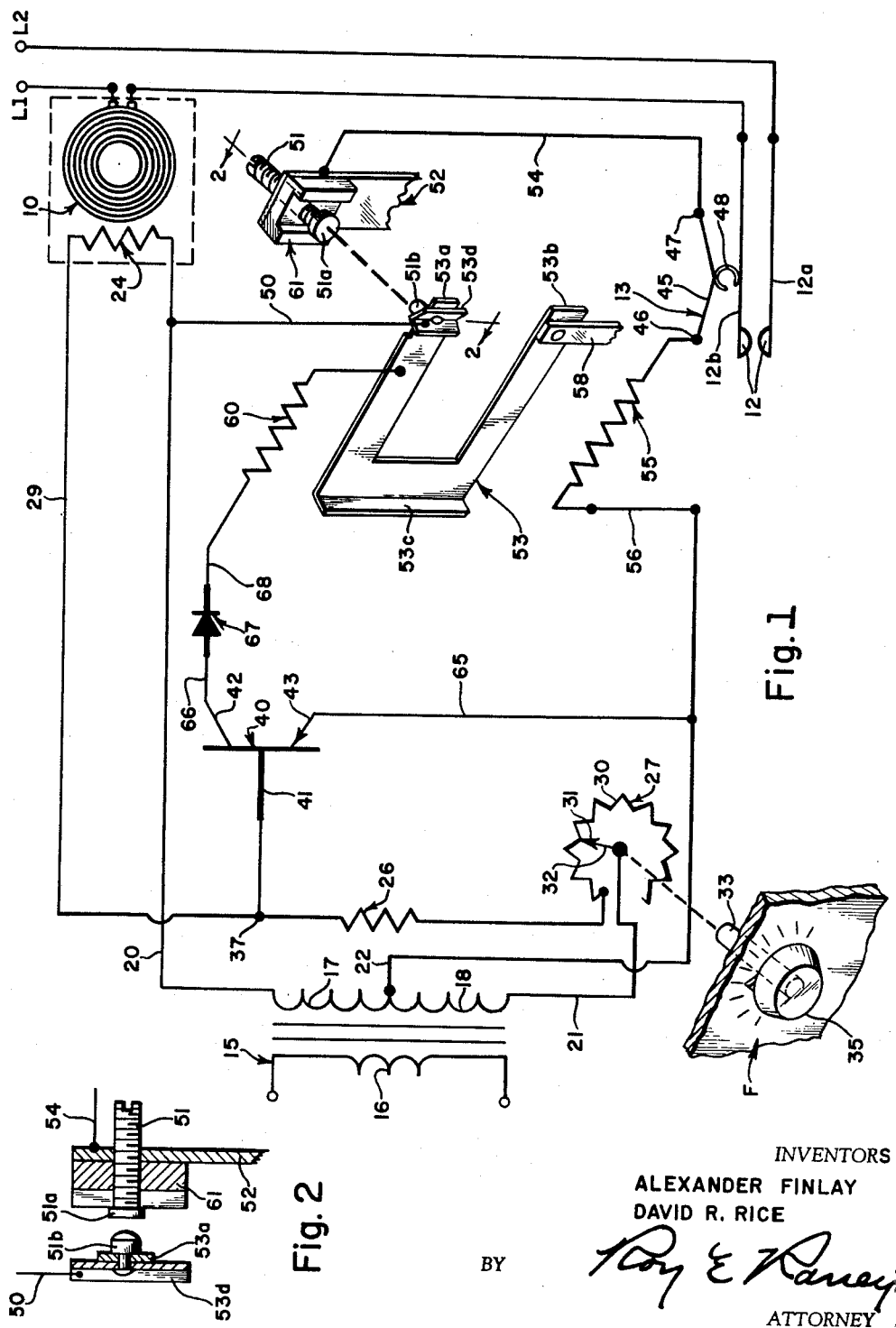

3,062,942
CONTROL APPARATUS
Alexander Finlay and David R. Rice, Chatham, N.J., assignors, by mesne assignments, to Ranco Incorporated, Columbus, Ohio, a corporation of Ohio
Filed Dec. 14, 1960, Ser. No. 75,817
3 Claims. (Cl. 219—20)

This invention relates to control apparatus comprising an electric switch and means for actuating such switch in a manner suitable for controlling or regulating the operation of electric heating elements such as those used in cook stoves.

More particularly, the invention relates to an improved control apparatus of the kind having a manually adjustable control knob or the like for selecting a temperature to be maintained in a cooking vessel or the like by a heating element, or the rate at which the heating element will heat a vessel when the latter is maintained at a given temperature as by boiling water, and which control apparatus is of the type adapted to operate the heating element at full capacity until reaching a temperature near but below the selected temperature, and thereafter to operate the heating element intermittently in a cycling manner between "off" and "on" conditions with the "on" cycles becoming gradually shorter in duration until the selected temperature or rate of boil is reached and maintained.

As a principal object, this invention aims to provide a reliable and sensitive electric heating element control apparatus in which a voltage signal, representing the difference between a selected desired temperature and the temperature of a cooking vessel heated by the heating element, is amplified by an electrical power amplifying means, such as a transistor, and is utilized in the actuation of electric switch means for controlling the energization of the heating element.

It is a more specific object of this invention to provide a control apparatus of the above mentioned character wherein a resistance which varies with temperature serves as a sensor when associated with a cooking vessel or the like heated by the heating element and forms part of a resistance bridge including a manually adjustable rheostat for selecting desired temperatures, so that differences in temperature of the sensor from a selected temperature will be represented by error signal voltages at a junction of the bridge, and wherein a transistor is connected to the junction and in a circuit path including an electrically energized heater means, so as to control current flow in that path and heater means in accordance with the signal voltages at the junction, the heater means forming part of thermally responsive means for actuating the electric switch for effecting energization of the heating element in the progressive manner mentioned above to obtain a desired temperature condition.

Still another object of this invention is to provide a heating element control apparatus wherein the electric switch is of the "hot wire relay" type and has a circuit for actuating current therefor which is completed or interrupted by contacts which are closed and opened by the action of two opposed thermally responsive means, such as bimetal members, one of which tends to close the contacts when heated by first electrical heating means, and the other of which tends to open the contacts when heated by a second electrical heating means, the first heating means being energized by current under the control of an electrical amplifying means, preferably a transistor, in response to voltage signals indicative of the temperature conditions produced by the heating element to be controlled by the apparatus, and the second heating means being energized by the hot wire relay actuating current so that whenever an amplified signal causes the one temperature responsive member to close the contacts and energize the hot wire relay, the other temperature responsive member will tend to overpower the first member to open the contacts, and in which apparatus the time constants of the thermally responsive means and the hot wire relay are so chosen that with an amplified signal indicating a difference greater than a given difference, the one temperature responsive means will maintain the contacts closed and the hot wire relay energized to maintain the heating element in "on" condition, and amplified signals indicating progressively lesser differences than the given difference will permit the other temperature responsive means to intermittently overpower the first temperature responsive means to open the contacts in a self interrupting manner and for progressively longer time periods, thereby intermittently deenergizing the hot wire relay and the heating element being controlled thereby for longer periods of time until the desired temperature condition is achieved and maintained.

Other objects and advantages of the invention will be apparent from the following description of a presently preferred form thereof and from the accompanying sheet of drawings forming a part of this specification, and in which FIG. 1 is a schematic view of a control apparatus embodying the invention and arranged to control an electrical heating unit of an electric stove; and FIG. 2 is a fragmentary view taken along line 2—2 of FIG. 1 and on an enlarged scale.

A control apparatus embodying the invention is illustrated and described herein with reference to use in regulating an electric heating element or burner 10 of a conventional stove or range, not shown, which is adapted to heat a cooking vessel when placed thereon. The heating element 10 is supplied with electric power in the form of 220 volts A.C., supplied to the unit 10 through power lines L1 and L2 which are connected to suitable mains, and which electrical power is under the control of contacts 12 forming a part of a hot wire type relay 13 in a manner described more fully hereinafter. A transformer 15, having a primary winding 16 and a center tapped secondary winding including portions 17 and 18, supplies electric power for operation of the control apparatus. The primary winding 16 of the transformer 15 may be conveniently connected across a source of A.C. current, usually 110 volts A.C. In the example shown, the windings 17 and 18 each supply 12 volts between their respective leads 20, 21 and a center tap conductor 22.

A sensor element 24 in the form of a thermally responsive resistor is associated with the heater element 10 in such a manner as to be heated by a cooking pan or vessel placed on the heating element 10. The sensor element 24 has a resistance which increases substantially linearly with increases in temperature, and this type of element is well known in the art and therefore is not described in detail here. A resistor 26, the purpose of which will later be apparent, and a manually variable rheostat 27 are connected in series relation with the sensor element 24 by a conductor 29, and a circuit can be traced from conductor 20 of the secondary winding 17 through sensor element 24, conductor 29, resistor 26, coil 30 and wiper 31 of rheostat 27, and conductor 21 of the secondary winding 18. The rheostat 27 comprises an adjusting arm 32 secured to a shaft 33 which is suitably rotatably mounted on a frame F and has a control knob 35 for manually rotating the shaft and adjustably positioning the wiper 31 on the resistance coil 30.

The sensor 24 and the rheostat 27, together with the resistance 26, form two arms of a resistance bridge joined at a junction 37. When the resistances of the two arms are equal, the voltage at the junction 37 will be the same as at the center tap 22. Differences in resistances in the arms, such as may be effected by changes in temperature at the sensor element 24 or by changes in the setting of the rheostat 27, will create a difference in the voltage at the junction 37 as compared with the center tap 22, the polarity of the voltage difference being dependent upon the cycle of operation of the transformer 15.

The adjusting knob 35 may be calibrated with reference to an indicia on the frame F to represent different temperatures which, if experienced by the sensor element 24, would result in equal resistances in the arms of the bridge and no differences in potential between the the junction 37 and the center tap 22. Variations in the voltage at junction 37 as compared to center tap 22 are utilized as voltage signals indicative of differences between the temperature experienced by the sensor element 24 and desired temperatures selected by the control knob 35. Such signal voltages are amplified by a transistor 40 having a base 41, a collector 42, and an emitter 43, and are utilized in such a manner as to control operation of the contacts 12 of the hot-wire relay 13 to energize the heating element 10.

The hot-wire relay 13 which includes the contacts 12, comprises a stationary contact arm 12a and a movable contact arm 12b. The contacts 12 are normally maintained in an open position by a resistance wire 45, the ends of which are anchored to posts 46 and 47 respectively, and the intermediate portion of which is connected to a bracket 48 on the contact arm 12b but insulated therefrom. When a current of a certain value flows through wire 45, the wire becomes heated and elongates, due to expansion, to permit the contact arm 12b to close the contacts 12 and thereby complete the circuit for energization of the heating element 10.

A circuit for energization of the heating wire 45 of the hot wire relay 13 may be traced from conductor 20 of the transformer 15, through conductor 50, a pair of contacts 51a and 51b shown clearly in FIG. 2, and one of which is carried by an outer end of a leg 53a of a bimetallic thermally responsive device 53, a conductor 54, wire 45, an electrically energized heater means 55, and a conductor 56 to the center tap conductor 22 of the transformer 15. The contacts 51a and 51b are normally held in an open condition by the thermally responsive bimetallic device 53. Leg 53b of the device 53 is mounted to the frame F by a bracket 58 and is arranged to be heated by current flowing in the heater means 55. Leg 53a is connected to leg 53b by a yoke portion having a flange 53c which stiffens this portion and prevents its flexing. A heater means 60 is provided adjacent the leg 53a and is adapted to be heated by current passing therethrough under the control of the transistor 40 in response to variations in the control signal voltages at junction 37 as will be described hereinafter.

Heating of the leg 53a by the heating means 60 tends to close the contacts 51a, 51b, whereas heating of the leg 53b by the heating means 55 tends to oppose the closing action of leg 53a and to open the contacts. The contact 51a is in the form of a screw 51 threadedly received in an opening through a fixed bracket 52 and through an opening in a permanent magnet 61. The normal opening between the contacts 51a and 51b may thereby be adjusted by threading screw 51 in one direction or the other. The magnet 61 tends to attract an iron strip 53a attached to the leg 53a, and functions to cause a positive closing of contact 51b on 51a to thereby prevent "chattering" of the contacts as they approach engaging positions, and the pull of the magnet requires an appreciable build-up of force by the bi-metal leg 53b to separate the contacts by overcoming the force in the leg 53a. The degree of pull of the magnet tending to hold the contacts closed can be regulated by adjusting the position of contact 51a relative to contact 51b by threading screw 51 in one direction or the other. When both legs 53a and 53b increase in temperature equally, the flexing of one is offset by the flexing of the other, and it will therefore be recognized that ambient changes in temperature will leave the relative position of contacts 51a and 51b unchanged.

The path of current for energizing the heating means 60, when the transistor 40 is in a conducting condition, may be traced from the center tap conductor 22 through a conductor 65, the emitter 43, collector 42, a conductor 66, a diode 67, conductor 68, the heater means 60, a portion of arm 53a, and conductor 50 to the conductor 20 of the transformer.

The operation of the control apparatus, when starting with the heater element 10 and a cooking vessel thereon in a relatively cold condition, is as follows:

A desired temperature condition is selected by rotation of the knob 35 placing the resistance bridge in an unbalanced condition with the resistance of the sensor element 24 being considerably less than the combined resistances of the resistor 26 and the rheostat 27. Accordingly, an error voltage signal will be present at the junction 37 and base 41 as compared with the emitter 43 and indicative of a lower temperature condition at the sensor 24 than is desired. Since the emitter 43 is connected directly to the center tap 22 it may be taken as a reference and during those half cycles when the collector is negative with respect to the emitter, and with the unbalanced condition and signal voltage just described at the base 41, the signal at the base will be negative and will call for an amplified emitter-collector current, energizing the heating means 60. As the heater means 60 heats the thermally responsive leg 53a, the contacts 51a, 51b will be brought to a closed condition, thereby energizing the hot wire relay 13 heating the expansible wire 45 thereof and quickly closing the contacts 12, thereby energizing the heating element 10.

The same current which energizes the hot wire 45 also energizes the heating means 55 heating the leg 53b of the U-shaped bi-metal element 53 and tending to oppose the leg 53a which holds the contacts closed. With a large error voltage signal present at the base 41, indicating a large difference between the temperature condition of the sensor 24 and the desired temperature, the current passed by the transistor is sufficient to cause the heater means 60 to heat leg 53a to an extent sufficient to keep the contact closed thereby maintaining the heating element 10 in an "on" condition until it approaches the desired temperature and the error voltage signal at the transistor base becomes small. As the error signal diminishes, and the current energizing heating means 60 diminishes therewith, a point will be reached when the leg 53b, heated by heating means 55, will just overpower the effects of the leg 53a and of the magnet 61 thereby causing the contacts 51a, 51b to open. At this time the hot wire relay 13 quickly opens the contacts 12 thereof, de-energizing the heating element 10 and also de-energizing the heating means 55 thereby allowing the leg 53b to commence to cool.

As the leg 53b cools, the current in the heating means 60, though diminished because of the reduced signal now present at the base of the transistor, will again close the contacts 51a, 51b passing current through the heater 55 and through the hot wire relay 13, quickly closing the contacts 12 of the latter and again energizing the heating element 10 for a period and again reducing the difference between the actual temperature at the sensor 24 and the desired temperature indicated by the knob 35. Accordingly, the signal at the base will continue to be reduced, as will the current in the heating means 60, thereby shortening the time required for the heating means 55 to heat the leg 53b to the extent necessary to overcome the effect of the leg 53a and the magnet 61. Thus, once the leg 53b has been heated to an extent sufficient to overcome the heating of the leg 53a by the heating means 60, the circuit through the hot wire relay 13 becomes self-interrupting and operates in a cyclic manner progressively reducing the periods of "on" time of the heating element 10 until the sensor resistance is raised to equal the resistance of the resistor 26 and rheostat 27. Thereafter, the apparatus will cycle at a rate just sufficient to maintain the desired temperature.

During those half cycles when the collector is positive with respect to the emitter, the diode 67 blocks the passage of current through the transistor, thereby preventing burn-out thereof during those cycles. It will be recognized that during times when the resistance of the sensor 24 is greater than the combined resistances of resistor 26 and the rheostat 27 as when a pan is hotter than the desired temperature, and when the collector is negative with respect to the emitter, the signal at the base will show a polarity opposite to that of the collector and the transistor will be shut off. Thus, during those times, no current will pass through the heating means 60 and the contacts 51a, 51b will be maintained in an open condition until such time as the sensor 24 indicates a temperature condition equal to or below the desired temperature condition.

The resistance 26 which is shown in series with the rheostat 27 is provided to permit the rheostat 27, which is preferably a one turn rheostat, to be effective throughout a desired operating range of temperatures. Inasmuch as the boiling point at an elevation of 10,000 feet is about 18° F. lower than at sea level, it is desirable to provide an adjustment on the apparatus whereby a mark on the calibrated dial can be made to indicate the position necessary to produce an incipient boil at any given altitude. The resistance 26 could be made adjustable and thereby provide a means for calibrating the dial to indicate the incipient boiling point.

Since water, once brought to its boiling temperature at a given altitude, will stay at substantially the same temperature regardless of the amount of heat applied, moving the dial to call for more heat will not raise the temperature of the boiling water and its vessel, but will increase the rate of boil. This is because the sensor will remain at the boiling temperature while the rheostat 27 is at a position which produces a signal which causes the heating element to be energized for "on" periods which are longer than are required to maintain the incipient boil. Accordingly, it is advantageous to provide the dial with a range of markings extending, for example, from "low boil" through "fast boil," which markings are used instead of the temperature markings when boiling water.

Because of the amplifying characteristics of the transistor 40, small changes in temperature at the sensor element 24 cause rapidly and effectively varied current to be applied to the heating element 60 of the thermally responsive member 53, thereby providing a particularly reliable and sensitive control apparatus. The "threshold" or point at which the apparatus becomes self-interrupting and cycles the heating element 10 in progressively shorter "on" periods, is determined principally by the effect of the magnet 61, which is adjusted by moving contact 51a as previously described, and also by the time constants of the bimetal member 53 and the heating capacities of the heating means 60, 55.

From the foregoing description of one form of control apparatus embodying this invention, and from the accompanying drawings, it will be apparent that there has been provided by this invention a particularly sensitive, yet reliable, apparatus for controlling an electric heating element of a stove or the like. It will also be apparent that the various electrical components, with the exception of the sensor element 24, can be mounted together in a suitable frame or can be arranged in different locations to suit the needs of various stove manufacturers.

Although the invention has been described with reference to a specific embodiment thereof, it will be understood that the invention includes all those modifications, adaptations and equivalents as are reasonably embraced by the scope of the claims hereof.

Having described our invention, we claim:

1. In a control apparatus comprising an electric switch for controlling energization of an electric heater to produce desired temperature conditions and having first and second thermally responsive members which are adapted to overpower one another in accordance with temperature differentials therebetween to operate said switch, first and second electrically energized heating means for heating said first and second members respectively, circuit means for energizing said first and second heating means comprising a transformer having a primary winding for connection to a source of alternating current and a secondary winding having a center-tap, a manually adjustable rheostat for selecting a desired temperature condition and a temperature responsive resistance being connected in series relation across said secondary winding and forming two arms of a resistance bridge, said temperature responsive resistance being subjected to the temperature condition being controlled so that differences thereof from a selected condition are represented by voltage signals at a junction between said resistance and said rheostat as compared with said center-tap, a transistor having a base connection at said junction between said resistance and rheostat and having its emitter and collector connections in series relation with a rectifier and with said first heater means across one half of said secondary winding, so as to control current flow through said first heater means in response to said signal voltages and to cause said first member to actuate said switch to one of its operating positions, contact means adapted to be closed upon actuation of said switch by said first member, said contact means being connected in series relation with said second heating means across one half of said secondary winding to cause said second member to oppose said first member whenever said switch is in said one of its positions, said second member being able to overpower said first member to actuate said switch to another of its operating positions only when said voltage signals fall below a predetermined value.

2. Apparatus for controlling current supply to a heater to provide full energization thereof up to a temperature below a selected predetermined temperature and then intermittent energization thereof with progressively longer off periods until said predetermined temperature is attained, said apparatus comprising relay means including first contact means for controlling said current supply, means for energizing said relay comprising second contact means operable by first and second thermally responsive members which are adapted to overpower one another in accordance with temperature differentials therebetween to open and close said second contacts, first and second electrically energized heating means for heating said first and second members respectively, circuit means for energizing said first and second heating means comprising a transformer having a primary winding for connection to a source of alternating current and a secondary winding having a center-tap, a manually adjustable rheostat for selecting said predetermined temperature and a temperature responsive resistance being connected in series relation across said secondary winding and forming two arms of a resistance bridge, said temperature responsive resistance being subjected to the temperature condition being controlled so that differences thereof from a selected condition are represented by voltage signals at a junction between said resistance and said rheostat as compared with said center-tap transistor means connected as an amplifier of said voltage signals so as to control current flow from one half of said secondary winding through said first heater means tending to close said second contact means, said second contact means being connected to control energization of said second heater means and said relay with current from the other half of said secondary winding so that said second member tends to oppose said first member whenever said second contacts are closed, said second member being able to overpower said first member to open said second contacts and deenergize said relay only when said voltage signals fall below a predetermined value.

3. Apparatus as defined in claim 2 and wherein said means for energizing said relay includes magnet means for determining the differential between temperatures of said first and second members required to open and close said second contact means.

References Cited in the file of this patent

UNITED STATES PATENTS

| 2,686,250 | Schroeder | Aug. 10, 1954 |
| 2,910,569 | Boddy | Oct. 27, 1959 |
| 2,958,008 | Bray et al. | Oct. 25, 1960 |
| 2,994,759 | Lipman | Aug. 1, 1961 |